(12) United States Patent
Kimble

(10) Patent No.: US 9,987,967 B1
(45) Date of Patent: Jun. 5, 2018

(54) DECK FITTING WITH REMOVABLE FIXTURE

(71) Applicant: TRIDENT SYSTEMS LLC, East Wenatchee, WA (US)

(72) Inventor: Michael Kimble, Spokane, WA (US)

(73) Assignee: TRIDENT SYSTEMS LLC, East Wenatchee, WA (US)

( * ) Notice: Subject to any disclaimer, the term of this patent is extended or adjusted under 35 U.S.C. 154(b) by 0 days. days.

(21) Appl. No.: 15/680,037

(22) Filed: Aug. 17, 2017

(51) Int. Cl.
*B60P 7/08* (2006.01)

(52) U.S. Cl.
CPC .................................. *B60P 7/0807* (2013.01)

(58) Field of Classification Search
CPC ..... B60P 7/0807; B60P 7/0823; B60P 7/0815; B60P 7/083; B60P 3/064; B60P 3/20; B60P 7/08; B60P 7/0876; B62D 21/20; B62D 25/2054; B62D 33/046; B62D 27/06; B62D 29/045; B62D 33/0207; B62D 33/033; Y10T 24/4773; Y10T 24/31
USPC ... 410/116, 106, 110, 97, 100, 101, 96, 121, 410/122, 129, 81; 248/205.1, 499, 500, 248/683, 690, 692, 925; 224/547, 553, 224/567, 534, 557, 563
See application file for complete search history.

(56) References Cited

U.S. PATENT DOCUMENTS

| | | | |
|---|---|---|---|
| 499,444 A | 6/1893 | Schumann |
| 1,169,635 A | 1/1916 | Grimes |
| 1,247,621 A | 11/1917 | Bennett |
| 1,520,123 A | 12/1924 | Gillen |
| 2,597,857 A | 5/1952 | Francis |
| 2,782,672 A | 2/1957 | Davis |
| 2,877,818 A | 3/1959 | Johnson |
| 3,238,834 A | 3/1966 | Appleberry |
| 3,312,138 A | 4/1967 | Cumming |
| 3,466,965 A | 9/1969 | McCarthy |
| 3,946,636 A | 3/1976 | Grey |
| 4,047,462 A | 9/1977 | Hurtig |
| 4,079,655 A | 3/1978 | Roberson, Jr. |
| 4,293,259 A | 10/1981 | Liebig |
| 4,294,570 A | 10/1981 | Meschnig |
| 4,453,845 A | 6/1984 | Donan, Jr. |

(Continued)

FOREIGN PATENT DOCUMENTS

| DE | 1092415 B | 11/1960 |
|---|---|---|
| DE | 1236439 B | 3/1967 |
| DE | 1936360 A1 | 3/1970 |

*Primary Examiner* — D Glenn Dayoan
*Assistant Examiner* — Sunsurraye Westbrook
(74) *Attorney, Agent, or Firm* — Paradice and Li LLP

(57) ABSTRACT

A removable locking apparatus includes a shaft body having an upper portion configured to receive tie-down equipment. A shaft socket is rotatably coupled to a lower portion of the shaft body, and a plurality of locking members are housed within the shaft socket. The locking members are configured to extend laterally from the shaft socket when the shaft body is rotated in a first direction relative to the shaft socket, and retract into the shaft socket when the shaft body is rotated in a second direction relative to the shaft socket. A clutch mechanism is coupled to the shaft socket and configured to slideably engage the shaft body. When disengaged, the clutch mechanism enables the plurality of locking members to extend or retract from the shaft socket. When engaged, the clutch mechanism prevents the plurality of locking members from extending and retracting from the shaft socket.

20 Claims, 7 Drawing Sheets

(56) References Cited

U.S. PATENT DOCUMENTS

| | | | |
|---|---|---|---|
| 4,557,631 A | 12/1985 | Donan, Jr. et al. | |
| 4,693,389 A | 9/1987 | Kalen | |
| 5,108,240 A | 4/1992 | Liebig | |
| 5,573,495 A | 11/1996 | Adler | |
| 5,702,215 A | 12/1997 | Li | |
| 5,865,559 A | 2/1999 | Yang | |
| 6,056,489 A | 5/2000 | Keller | |
| 6,161,999 A | 12/2000 | Kaye et al. | |
| 6,203,260 B1 | 3/2001 | Henline et al. | |
| 6,779,316 B2 * | 8/2004 | Carroll | E04G 21/3261 411/340 |
| 6,918,721 B2 | 7/2005 | Venton-Walters et al. | |
| 7,077,610 B2 | 7/2006 | Diaz | |
| 7,150,596 B2 | 12/2006 | Diaz et al. | |
| 7,390,155 B1 | 6/2008 | Diaz et al. | |
| 7,530,618 B2 * | 5/2009 | Collins | B60P 1/003 224/403 |
| 8,439,613 B1 * | 5/2013 | Prentice | F16B 13/0808 411/121 |
| 9,303,669 B2 * | 4/2016 | Agri | F16B 13/0808 |

\* cited by examiner

DECK FITTING WITH REMOVABLE FIXTURE

TECHNICAL FIELD

The present embodiments relate generally to deck fittings and specifically to a deck fitting with a removable fixture for anchoring tie-down equipment to a platform.

BACKGROUND OF RELATED ART

The transportation industry (e.g., marine, rail, trucking, aviation, etc.) uses tie-down equipment to secure objects to a fixed platform. For example, when a helicopter lands on a marine vessel or off-shore platform, the helicopter must be secured to the platform to prevent it from being jettisoned overboard. Similarly, when a heavy load is to be transported on a vehicle (e.g., rail car, cargo ship, flatbed truck, etc.), the load must be securely tied down to a deck of the vehicle to prevent it from shifting around during transport. Example tie-down equipment includes cable straps, chains, cleats, nylon ratchets, winches, and the like. The tie-down equipment is typically wrapped around the load and fastened to one or more deck fittings mounted on the surface of the deck. Thus, the deck fittings must be securely mounted to the deck or platform in order to "anchor" the tie-down equipment.

Deck fittings are typically welded to the deck or platform of a vehicle. A conventional deck fitting has a metal base that can be mounted (e.g., welded) to the deck or platform of the vehicle and a loop-shaped structure ("eye") that protrudes from the base. The tie-down equipment can be tied, fastened, or otherwise secured to the loop-shaped structure protruding from the base of the deck fitting. Although the one-piece design provides a secure anchoring point for the tie-down equipment, the loop-shaped protrusions may be an ungainly sight (e.g., when not in use) and a potential tripping hazard for individuals walking across the deck of the vehicle. Furthermore, such deck fittings are constantly exposed to the elements, which may lead to corrosion and eventual breakdown in the structural integrity of the device. Thus, it may be desirable to remove or detach the deck fitting from the deck of the vehicle, and reattach the deck fitting when needed, without the use of sophisticated tools or machinery.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A removable locking apparatus for anchoring tie-down equipment is disclosed. The removable locking apparatus includes a shaft body having an upper portion configured to receive the tie-down equipment. A shaft socket is rotatably coupled to a lower portion of the shaft body, and a plurality of locking members are housed within the shaft socket. The locking members are configured to extend laterally from the shaft socket when the shaft body is rotated in a first direction relative to the shaft socket, and retract into the shaft socket when the shaft body is rotated in a second direction relative to the shaft socket. A clutch mechanism is coupled to the shaft socket and configured to slideably engage the shaft body. When disengaged from the shaft body, the clutch mechanism enables the plurality of locking members to extend or retract from the shaft socket. When engaged with the shaft body, the clutch mechanism prevents the plurality of locking members from extending and retracting from the shaft socket. For example, the clutch mechanism may enable the shaft body to rotate relative to the shaft socket when disengaged from the shaft body, and may lock the shaft body to the shaft socket when engaged with the shaft body.

The clutch mechanism may be configured to engage the shaft body by sliding to a first position along the length of the shaft body, and disengage the shaft body by sliding to a second position along the length of the shaft body. For example, the clutch mechanism may be configured to slide to the second position when an external force is exerted on the clutch mechanism in a direction of the second position. Further, the clutch mechanism may return to the first position when no external forces are exerted on the clutch mechanism. In some aspects, a spring may be coupled between the clutch mechanism and the upper portion of the shaft body such that the spring is in a decompressed state when the clutch mechanism is in the first position, and in a compressed state when the clutch mechanism is in the second position.

A locking collar may be mated to the clutch mechanism and configured to prevent the clutch mechanism from sliding to the second position based at least in part on a positioning of the locking collar. For example, the locking collar may be mated to the clutch mechanism via interlocking threads on an outer surface of the clutch mechanism and an inner surface of the locking collar. In some aspects, the clutch mechanism may be prevented from sliding to the second position when the locking collar is rotated, along the interlocking threads, to a locking position. Further, in some aspects, a first rotational locking element on the upper position of the shaft body may be configured to engage a second rotational locking element on the locking collar when the locking collar is rotated to the locking position. For example, the first rotational locking element may comprise a ball joint and the second rotational locking element may comprise a divot. The ball joint may be aligned with the divot when the locking collar is rotated to the first position.

A system for securing tie-down equipment to a platform is also disclosed. The system includes a base apparatus mounted to the platform and a removable locking apparatus coupled to the base apparatus. A top surface of the base apparatus includes an opening to a channel within the base apparatus. The removable locking apparatus includes a shaft body having an upper portion configured to receive the tie-down equipment. A shaft socket is rotatably coupled to a lower portion of the shaft body and inserted into the channel of the base apparatus. The shaft socket is configured to lock the removable locking apparatus to the base apparatus when the shaft body is rotated in a first direction relative to the shaft socket, and unlock the removable locking apparatus from the base apparatus when the shaft socket is rotated in a second direction relative to the shaft socket. A clutch mechanism is coupled to the shaft socket and configured to slidably engage the shaft body. When disengaged form the shaft body, the clutch mechanism enables the removable locking apparatus to be locked or unlocked from the base apparatus. When engaged with the shaft body, the clutch mechanism prevents the removable locking apparatus from being locked and unlocked from the base apparatus.

The clutch mechanism may be configured to disengage the shaft body by sliding to a first position along the length of the shaft body when an external force is exerted on the clutch mechanism in a direction of the first position. Further, the clutch mechanism may be configured to engage the shaft body by sliding to a second position along the length of the shaft body. A locking collar may be mated to the clutch mechanism via interlocking threads on an outer surface of the clutch mechanism and an inner surface of the locking color. In some aspects, the clutch mechanism is prevented from sliding to the second position when the locking collar is rotated, along the interlocking threads, to a locking position.

A depressible plunger may be provided within the channel of the base apparatus. The depressible plunger may be configured to establish a watertight seal around the opening at the top surface of the base apparatus when no external forces are exerted on the depressible plunger, and depress into the channel when one or more external forces are exerted on the depressible plunger. In some aspects, an o-ring may be coupled to a base of the depressible plunger. For example, the o-ring may prevent water from entering the channel, beneath the depressible plunger, when the one or more external forces are exerted on the depressible plunger. In some aspects, an o-ring may be coupled to the bottom surface of the clutch mechanism and configured to prevent water from entering the channel of the base apparatus when the locking mechanism is locked to the base apparatus.

The base apparatus may comprise an attachment collar mounted to the platform and a housing mated to the attachment collar. For example, the channel may be formed within the housing. In some aspects, the attachment collar may be mounted flush with a surface of the platform. A height of the housing may be adjustable relative to the attachment collar. For example, the housing may be mated to the attachment collar via interlocking threads on an outer surface of the housing and an inner surface of the locking collar. Thus, the height of the housing may be adjusted by rotating the housing along the interlocking threads. In some aspects, a first set of grooves on the outer surface of the housing are configured to form one or more pinholes when aligned with a second set of grooves on the inner surface of the locking collar, and the height of the housing may be locked by inserting drift pins within the one or more pinholes.

BRIEF DESCRIPTION OF THE DRAWINGS

The present embodiments are illustrated by way of example and are not intended to be limited by the figures of the accompanying drawings.

Like reference numerals refer to corresponding parts throughout the drawing figures.

DETAILED DESCRIPTION

In the following description, numerous specific details are set forth such as examples of specific components and processes to provide a thorough understanding of the present disclosure. The term "coupled" as used herein means connected directly to or connected through one or more intervening components. Furthermore, the term "detachable" means capable of being separated and recombined without the use of specialized tools and/or machinery. Also, in the following description and for purposes of explanation, specific nomenclature is set forth to provide a thorough understanding of the aspects of the disclosure. However, it will be apparat to one skilled in the art that these specific details may not be required to practice the example embodiments.

Figure 1:
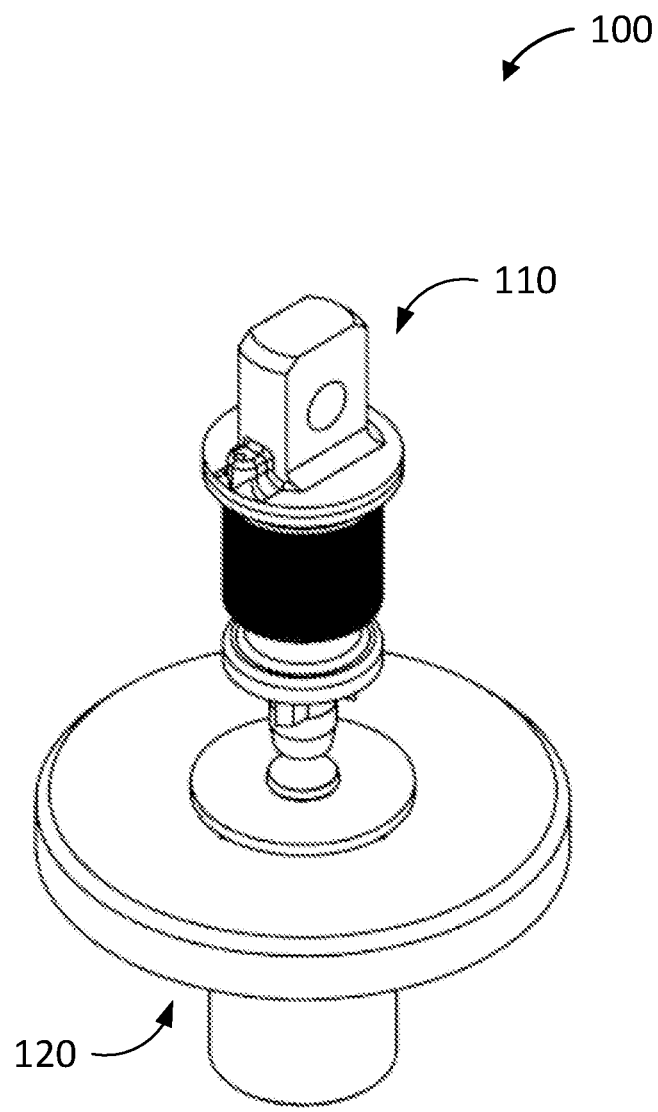
FIG. 1 shows a perspective view of a detachable tie-down system, in accordance with some embodiments.

FIG. 1 shows a perspective view of a detachable tie-down system 100, in accordance with some embodiments. The detachable tie-down system 100 includes an upper assembly 110 and a lower assembly 120. The lower assembly 120 is configured to be mounted to a secure platform or solid surface (such as the deck of a vehicle or vessel). More specifically, the lower assembly 120 may be attached to the platform in a permanent manner. For example, the lower assembly 120 may be welded and/or bolted to the underlying deck or platform. Accordingly, the lower assembly 120 may provide a strong anchoring point on the surface of the platform.

The upper assembly 110 is configured to "receive" tie-down equipment (e.g., cable straps, chains, cleats, nylon ratchets, winches, and the like). For example, the upper assembly 110 may include one or more attachment points (e.g., holes or eyelets) to which the tie-down equipment can be fastened or secured. In some embodiments, the upper assembly 110 may be detachably coupled to the lower assembly 120. For example, the upper assembly 110 may be locked in, or otherwise securely attached, to the lower assembly 120 to anchor the tie-down equipment to the underlying platform. In some embodiments, the upper assembly 110 may be secured to the lower assembly 120 without the use of any tools or machinery. For example, a user may lock the upper assembly 110 to the lower assembly 120 using only the user's hands (e.g., by rotating, twisting, and/or pressing down on one or more components of the upper assembly 110).

Further, in some embodiments, the upper assembly 110 may be detached or removed from the lower assembly 120 without the use of any tools or machinery. For example, the user may unlock the upper assembly 110 from the lower assembly 120 using only the user's hands (e.g., by rotating, twisting, and/or pressing down on one or more components of the upper assembly 110). This allows the upper assembly 110 to be easily removed and stowed away when not in use. In some embodiments, the lower assembly 120 may be mounted flush with the surface of the deck or platform. Thus, when the upper assembly 110, the lower assembly 120 may not leave any obstructions or protrusions on the surface of the deck or platform. Aspects of the present disclosure may be particularly well-suited for implementation on the decks of boats, trains, or other vehicles where obstructions or protrusions from the deck surface can pose a tripping hazard for individuals traversing the deck.

Figure 2A:
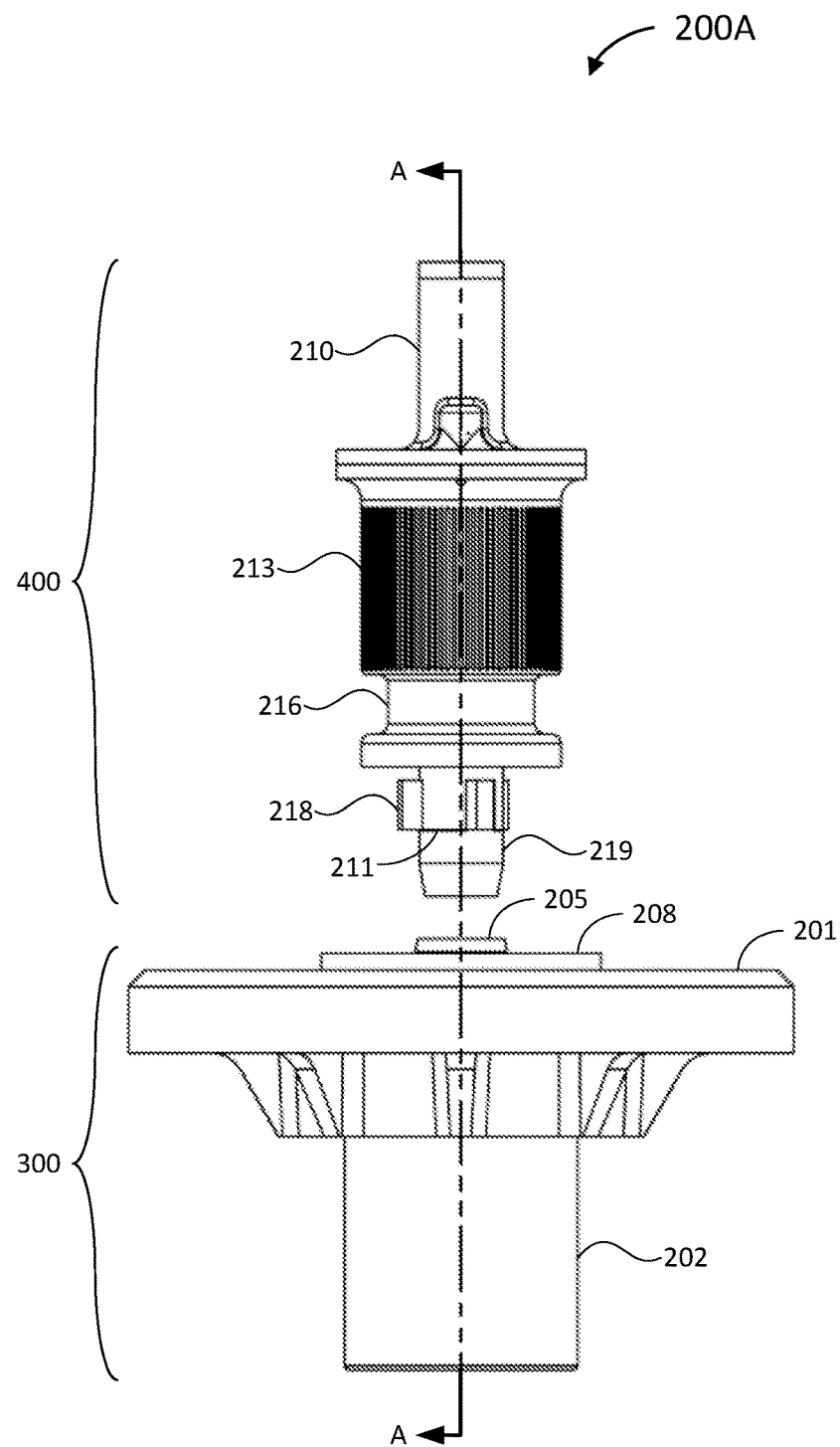
FIGS. 2A and 2B illustrate a detachable tie-down system in a detached configuration, in accordance with some embodiments.
Figure 2B:
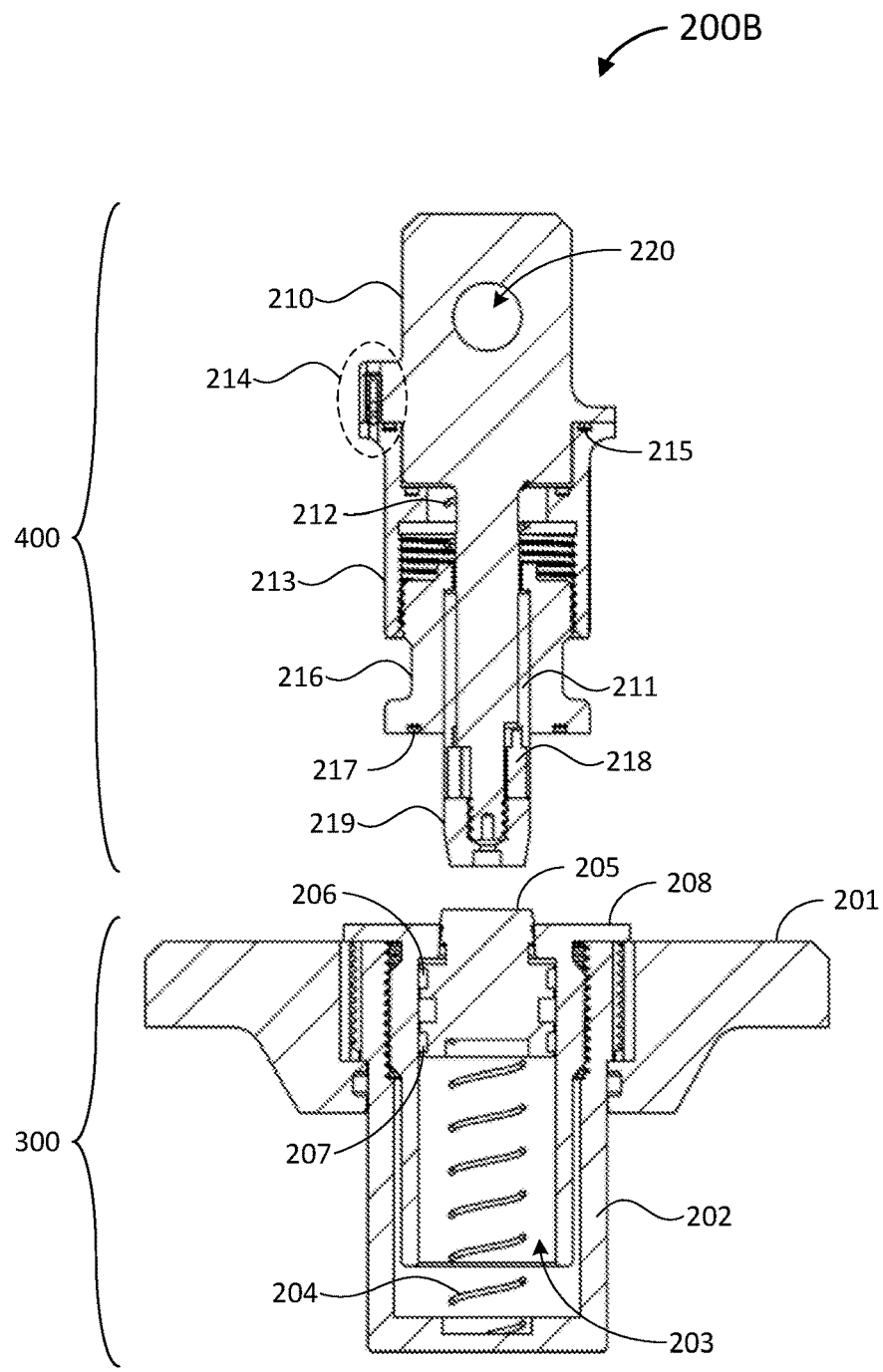
Figure 3:
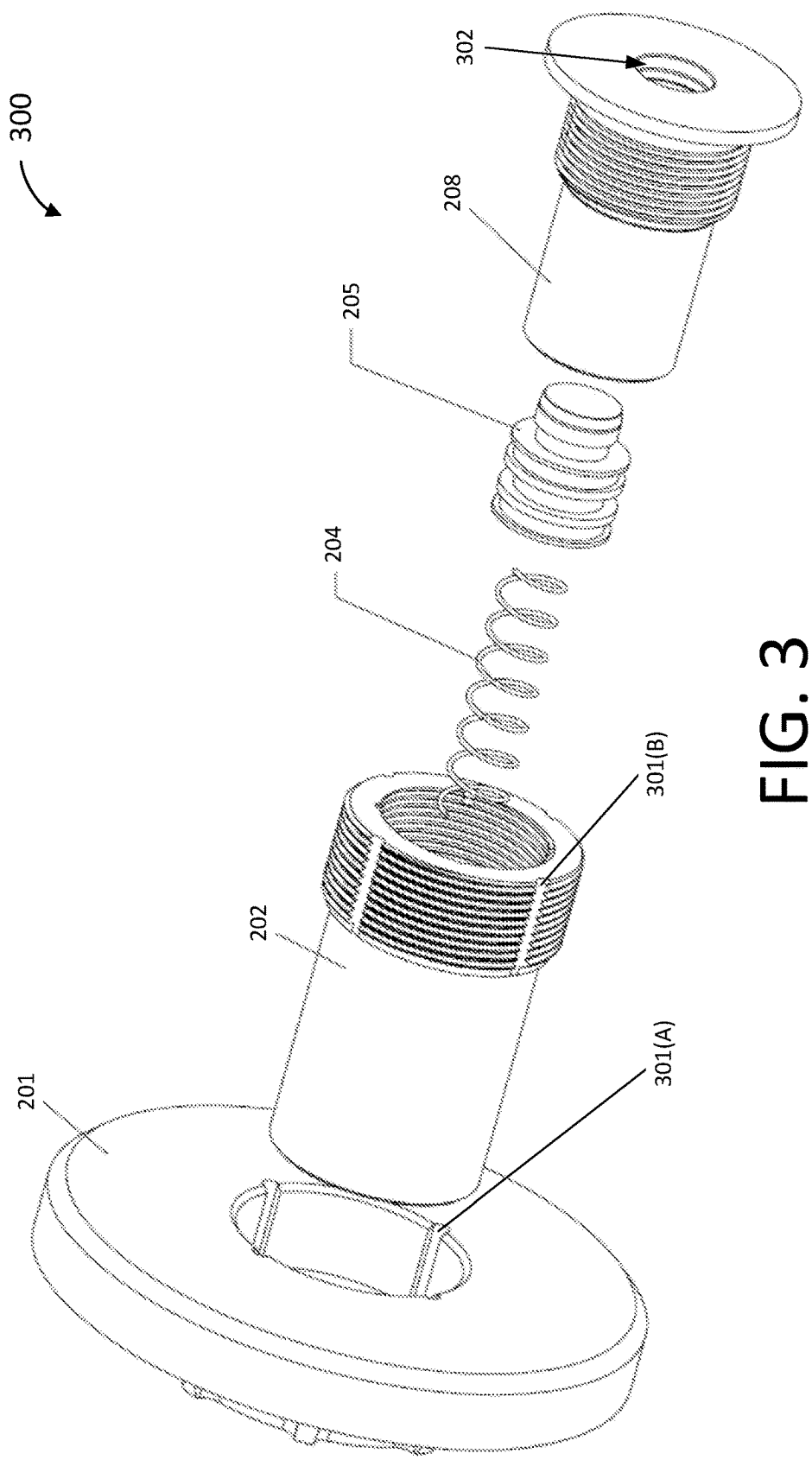
FIG. 3 shows an exploded isometric view of a base apparatus for a detachable tie-down system, in accordance with some embodiments.
Figure 4:
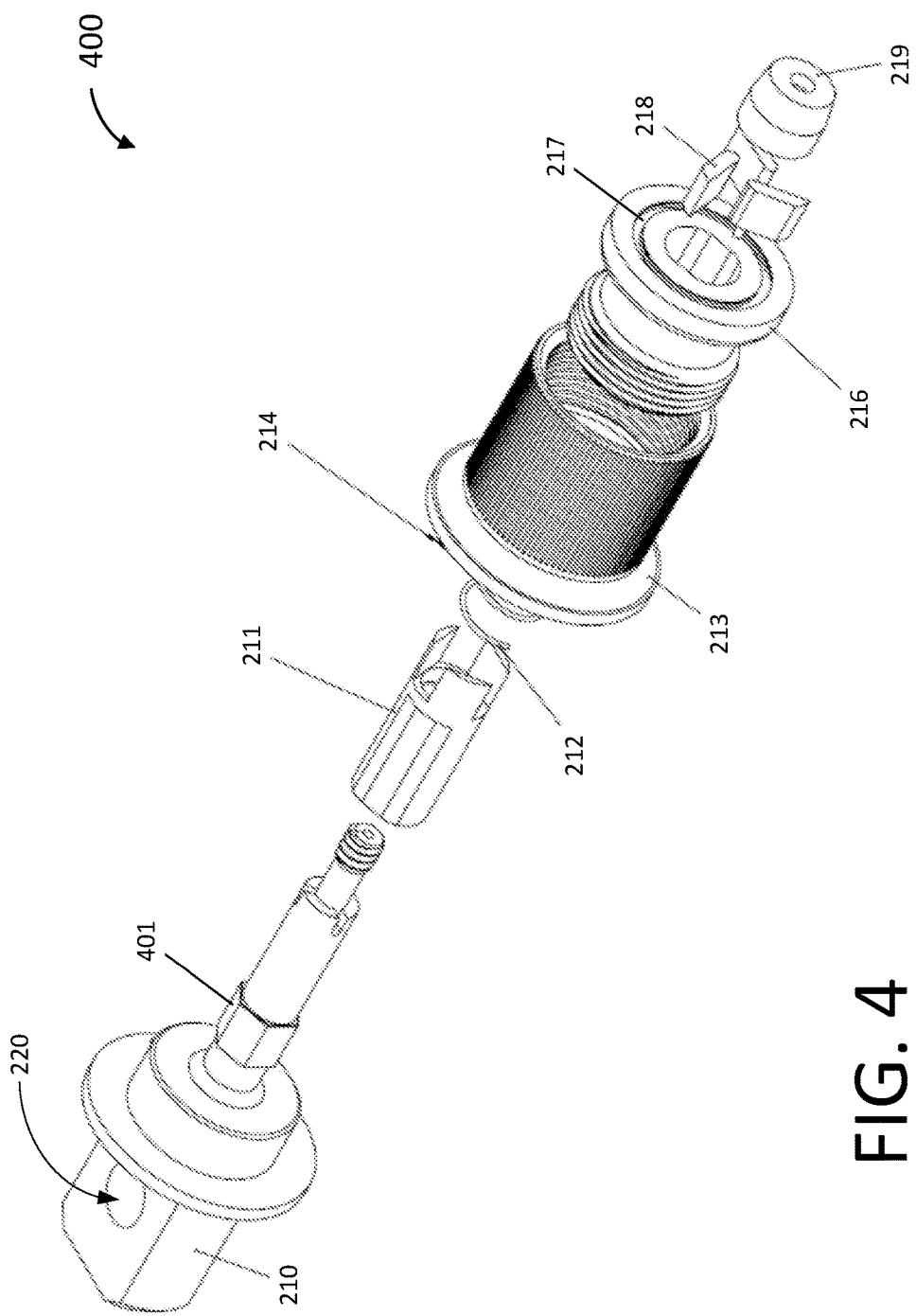
FIG. 4 shows an exploded isometric view of a removable locking apparatus for a detachable tie-down system, in accordance with some embodiments.

FIGS. 2A and 2B illustrate a detachable tie-down system 200 in a detached configuration, in accordance with some embodiments. Specifically, FIG. 2A shows a side view 200A of the detachable tie-down system, whereas FIG. 2B shows a cross-sectional view 200B of the detachable tie-down system depicted in FIG. 2A (e.g., section A-A). The detachable tie-down system 200 includes a base apparatus 300 and a removable locking apparatus 400. With reference for example to FIG. 1, the base apparatus 300 may be an embodiment of the lower assembly 120 and the removable locking apparatus 400 may be an embodiment of the upper assembly 110. FIG. 3 shows a more detailed embodiment of the base apparatus 300, and FIG. 4 shows a more detailed embodiment of the removable locking apparatus 400.

The base apparatus 300 includes an attachment collar 201, a housing 202, a plunger 205, and a plunger guide 208. The attachment collar 201 may be mounted (e.g., welded, bolted, or otherwise permanently attached) to a deck or platform. In some embodiments, the attachment collar 201 may be mounted flush (or in an unobtrusive manner) with the surface of the deck or platform. In the present embodiments, the attachment collar 201 is depicted as a circular structure. However, in actual implementations, the attachment collar 201 may be of various other shapes and/or sizes. The housing 202 is coupled to the inside of the attachment collar 201, and houses the internal components of the base apparatus 300. In some embodiments, the housing 202 may be coupled to the attachment collar 201 via interlocking threads on an inner surface of the attachment collar 201 and an outer surface of the housing 202. For example, the housing 202 may be secured to the attachment collar 201 by rotating the housing 202, along the interlocking threads, into the attachment collar 201.

In some embodiments, the height of the housing 202 may be adjusted (e.g., relative to the attachment collar 201). For example, rotating the housing 202 in a first direction (e.g., clockwise) causes the housing 202 to be seated deeper into the attachment collar 201, thus lowering the height of the housing 202 and/or protrusion above the deck surface. On the other hand, rotating the housing 202 in a second direction (e.g., counterclockwise) causes the housing 202 to be unseated from the attachment collar 201, thus raising the height of the housing 202 and/or protrusion above the deck surface. In some embodiments, the height of the housing 202 may be locked in place (e.g., by preventing the housing 202 from rotating relative to the attachment collar 201). For example, as shown in FIG. 3, the inner surface of the attachment collar 201 may include a number of grooves or channels 301(A), and the outer surface of the housing 202 may include a number of corresponding grooves or channels 301(B). The grooves 301(A) on the inner surface of the attachment collar 201 may be aligned with the grooves 301(B) on the outer surface of the housing 202 to form respective pinholes. Accordingly, the housing 202 may be locked from rotating relative to the attachment collar 201 by inserting drift pins (not shown for simplicity) into the pinholes formed by grooves 301(A) and 301(B).

The plunger guide 208 is coupled to the inside of the housing 202, and provides a channel 203 for receiving the removable locking apparatus 400. For example, as shown in FIG. 3, the top surface of the plunger guide 208 may include an opening 302 to the channel 203. At least a portion of the removable locking apparatus 400 may be inserted into the opening 302 and locked within the channel 203 (e.g., as described in greater detail below). In some embodiments, the plunger guide 208 may be coupled to the housing 202 via interlocking threads on an inner surface of the housing 202 and an outer surface of the plunger guide 208. For example, the plunger guide 208 may be secured to the housing 202 by rotating the plunger guide 208, along the interlocking threads, into the housing 202.

The plunger 205 is coupled to the inside of the plunger guide 208 and configured to seal the opening 302 (and channel 203) from moisture and debris when the removable locking apparatus 400 is detached from the base apparatus 300. In some embodiments, the plunger 205 may be spring-loaded. For example, the plunger 205 may be coupled to a spring 204 that is also housed within the channel 203. The spring 204 exerts a force on the plunger 205 in the direction of the opening 302. Thus, when the spring 204 is in a "decompressed" state (e.g., the tension in the spring 204 is below a threshold level), the plunger 205 is pressed against the top surface of the plunger guide 208, sealing off the opening 302 from moisture and/or debris. When an external force is exerted on the plunger 205 (e.g., by inserting the removable locking apparatus 400 into the opening 302), the plunger 205 may be depressed further into the channel 203, placing the spring 204 in a "compressed" state. Furthermore, the tip of the plunger 205 may be contoured to the opening 302 of the base apparatus 300 to ensure a tight fit when the plunger 205 is pressed against the top of the base apparatus 300 (e.g., by the spring 204).

In some embodiments, the plunger 205 may form a watertight seal around the opening 302 when the removable locking apparatus 400 is detached from the base apparatus 300. For example, the plunger 205 may include channels 206 and 207 configured to receive rubber o-rings (not shown for simplicity). Although two o-ring channels 206 and 207 are depicted in the examples of FIGS. 2B and 3, in actual implementations the plunger 205 may be coupled to fewer or more o-rings than those shown. The o-rings may provide a watertight seal around the opening 302 of the plunger guide 208 when the no external forces are exerted on the plunger 205. Furthermore, the o-rings may seal off the sides of the channel 203, thus preventing any moisture and/or debris that may have entered the channel 203, when the plunger 205 is depressed, from reaching (and corroding) the internal components behind the plunger 205 (such as the spring 204 and/or inner surface of the housing 202).

The removable locking apparatus 400 includes a shaft body 210, a shaft socket 211, a locking collar 213, and a clutch mechanism 216. The shaft body 210 is configured to receive the tie-down equipment (e.g. cable straps, chains, cleats, nylon ratchets, winches, and the like). For example, an upper portion of the shaft body 210 includes an eyelet 220 to which the tie-down equipment can be fastened or secured. The shaft socket 211 is rotatably coupled to a lower portion of the shaft body 210 and houses a plurality of locking members 218. The locking members 218 may be configured to extend (laterally) from the shaft socket 211 by rotating the shaft body 210 in a first direction (e.g., clockwise) relative to the shaft socket 211. Furthermore, the locking members 218 may be configured to retract into the shaft socket 211 by rotating the shaft body 210 in a second direction (e.g., counterclockwise) relative to the shaft socket 211. In some embodiments, the locking members 218 may be used to lock the removable locking apparatus 400 to the base apparatus 300 (e.g., within the channel 203). Although three locking members 218 are depicted in the examples of FIGS. 2A and 4, in actual implementations the shaft socket 211 may house fewer or more locking members 218 than those shown. The shaft socket 211, and locking members 218, may be fastened or secured to the lower end of the shaft body 210 via a weld collar 219.

The clutch mechanism 216 is coupled to the shaft socket 211 and configured to slideably "engage" the shaft body 210. For example, with reference to FIG. 4, the shaft body 210 may include an engagement feature 401 (e.g., shown as a hexagonal-shaped protrusion) that engages with the clutch mechanism 216 when the clutch mechanism 216 slides to a first position along the length of the shaft body 210 (e.g., such that an inner surface of the clutch mechanism 216 is in contact with the engagement feature 401), and disengages from the clutch mechanism 216 when the clutch mechanism 216 slides to a second position along the length of the shaft body 210 (e.g., such that the inner surface of the clutch mechanism 216 does not contact the engagement feature 401). When the clutch mechanism 216 engages the shaft body 210, the clutch mechanism 216 and shaft socket 211 may be rotationally locked to the shaft body 210. In other words, the shaft body 210 cannot be rotated relative shaft socket 211 (e.g., the shaft body 210 and shaft socket 211 must rotate in the same direction). When the clutch mechanism 216 disengages the shaft body 210, the clutch mechanism 216 and shaft socket 211 are unlocked from the shaft body 210. In other words, the shaft body 210 may be rotated relative to the shaft body (e.g., the shaft body 210 and shaft socket 211 can rotate in opposite directions).

Accordingly, the clutch mechanism 216 may enable and/or prevent the locking members 218 from extending and/or retracting from the shaft socket 211. For example, when the clutch mechanism 216 is disengaged from the shaft body 210, the locking members 218 may be extended and/or retracted from the shaft socket 211 (e.g., by rotating the shaft body 210 relative to the shaft socket 211). However, when the clutch mechanism 216 is engaged from the shaft body 210, the locking members 218 are locked in their current position (e.g., either extended or retracted), and thus prevented from extending and/or retracting from the shaft socket 211. (e.g., by locking the rotation of the shaft body 210 relative to the shaft socket 211.

In some embodiments, the clutch mechanism 216 may be spring-loaded. For example, a spring 212 may be coupled between the clutch mechanism 216 and the shaft body 210. The spring 212 exerts a force on the clutch mechanism 216 in the direction of the first position (e.g., where the clutch mechanism 216 engages the shaft body 210). Thus, when the spring 212 is in a decompressed state (e.g., the tension in the spring 204 is below a threshold level), the clutch mechanism 216 is engaged with the shaft body 210. When an external force is exerted on the clutch mechanism 216 in the direction of the second position, the clutch mechanism 216 may be disengaged from the shaft body 210, placing the spring 212 in a compressed state. Accordingly, the clutch mechanism 216 may be configured to engage the shaft body 210 as long as no external forces are exerted on the clutch mechanism 216.

The removable locking apparatus 400 may be attached to the base apparatus 300 by inserting the locking members 218 (e.g., including at least a portion of the shaft body 210 and/or shaft socket 211) into the channel 203 of the base apparatus 300. Furthermore, the removable locking apparatus 400 may be locked to the base apparatus 300 by extending the locking members 218 while they are inside the channel 203. This hooks the lower portion of the shaft body 210 to the interior of the plunger guide 208, for example, by preventing the shaft body 210 from being withdrawn from the opening 302. In some embodiments, the clutch mechanism 216 may form a watertight seal around the top surface of the plunger guide 208 when the removable locking apparatus 400 is attached to the base apparatus 300. For example, a bottom surface of the clutch mechanism 216 may include a channel 217 configured to receive a rubber o-ring (not shown for simplicity). Although a single o-ring channel 217 is depicted in the examples of FIGS. 2B and 4, in actual implementations the clutch mechanism 216 may be coupled to fewer or more o-rings than those shown. The o-rings may provide a watertight seal around the exposed surface of the plunger guide 208, further sealing off the opening 302 from moisture and/or debris when the removable locking apparatus 400 is attached to the base apparatus 300.

The locking collar 213 may provide an additional layer of security by adding to the structural integrity of the removable locking apparatus 210 and preventing the removable locking apparatus 400 from being unintentionally unlocked and/or detached from the base apparatus 300. For example, the locking collar 213 may be coupled to the clutch mechanism 216 and configured to prevent the clutch mechanism 216 from sliding along the length of the shaft body 210. More specifically, the clutch mechanism 216 may effectively extend (or reduce) the length of the clutch mechanism 216 such that there is insufficient (or sufficient) room for the clutch mechanism 216 to slide to the second position (e.g., where the clutch mechanism 216 would otherwise disengage the shaft body 210).

In some embodiments, the locking collar 213 may be coupled to the clutch mechanism 216 via interlocking threads on an outer surface of the clutch mechanism 216 and an inner surface of the locking collar 213. For example, the effective length of the clutch mechanism 216 may be extended by rotating the locking collar 213 in a first direction (e.g., counterclockwise) relative to the clutch mechanism 216. When the locking collar 213 is rotated to a locking position (e.g., after a threshold number of counterclockwise rotations), the clutch mechanism 216 cannot slide to the second position, and thus the locking members 218 may be locked in their current state (e.g., either extended or retracted). Furthermore, the effective length of the clutch mechanism 216 may be reduced by rotating the locking collar 213 in a second direction (e.g., clockwise) relative to the clutch mechanism 216. When the locking collar 213 is rotated to an unlocking position (e.g., after a threshold number of clockwise rotations), the clutch mechanism 216 may be free to slide to the second position, and thus the state of the locking members 218 may be changed.

In some aspects, the locking collar 213 may be rotated to the locking position when the top surface of the locking collar 213 is in contact with the shaft body 210. In some embodiments, the locking collar 213 may form a watertight seal around the outer surface of the shaft body 210 when the locking collar 213 is in the locking position. For example, the top surface of the locking collar 213 may include a channel 215 configured to receive a rubber o-ring (not shown for simplicity). Although a single o-ring channel 215 is depicted in the example of FIG. 2B, in actual implementations the locking collar 213 may be coupled to fewer or more o-rings than those shown. The o-rings may provide a watertight seal around the internal components of the removable locking apparatus 400, thus preventing moisture and/or debris from being trapped within (and corroding the internal components of) the removable locking apparatus 400.

Still further, in some embodiments, the removable locking apparatus 400 may further include a rotational locking feature 214 configured to hold the locking collar 213 in the locking position until at least a threshold amount of torque is applied to overcome the locking feature 214 (e.g., thus breaking the lock). For example, the rotational locking feature 214 may be formed by a locking element on the shaft body 210 and a corresponding locking element on the locking collar 213. In some aspects, the locking element on the shaft body 210 (or locking collar 213) may be a ball joint and the corresponding locking element on the locking collar 213 (or shaft body 210) may be a groove or divot. Thus, when the locking element on the shaft body 210 is aligned with the locking element on the locking collar 213 (e.g., the ball joint is seated within the divot), the locking collar 213 may be held in the locking position until at least a threshold amount of torque is applied to overcome the rotational locking feature 213 (e.g., to separate the ball joint from the divot).

It is noted that the detachable tie-down system 200 provides several advantages over existing deck fittings. For example, the multi-piece design allows the removable locking apparatus 400 to be detached and stowed away when not in use. This not only provides a more aesthetically pleasing look for the deck of a vehicle (e.g., boat, train, truck, etc.), but also prevents tripping hazards that may otherwise be caused by protrusions or obstructions on the surface of the deck. As described above, the tie-down system 200 also includes a number of water-sealing features that are configured to prevent moisture and/or debris from entering (and corroding) any of the internal components of the base apparatus 300 and/or the removable locking apparatus 400. In some embodiments, the individual components 201-220 of the tie-down system 200 may be constructed out of stainless steel (or some other corrosion-resistant material) to further reduce the chances of corrosion. Further, in some embodiments, interlocking surfaces of the tie-down system 200 may be formed (or coated) with different materials to prevent galling.

The tie-down system 200 includes a number of locking features that are configured to prevent the removable locking apparatus 400 from being unintentionally detached from the base apparatus 300. Each of the locking features may be operated by hand, and without the use of tools or machinery. This further increases the ease with which the tie-down system 200 may be assembled and/or disassembled.

Figure 5A:
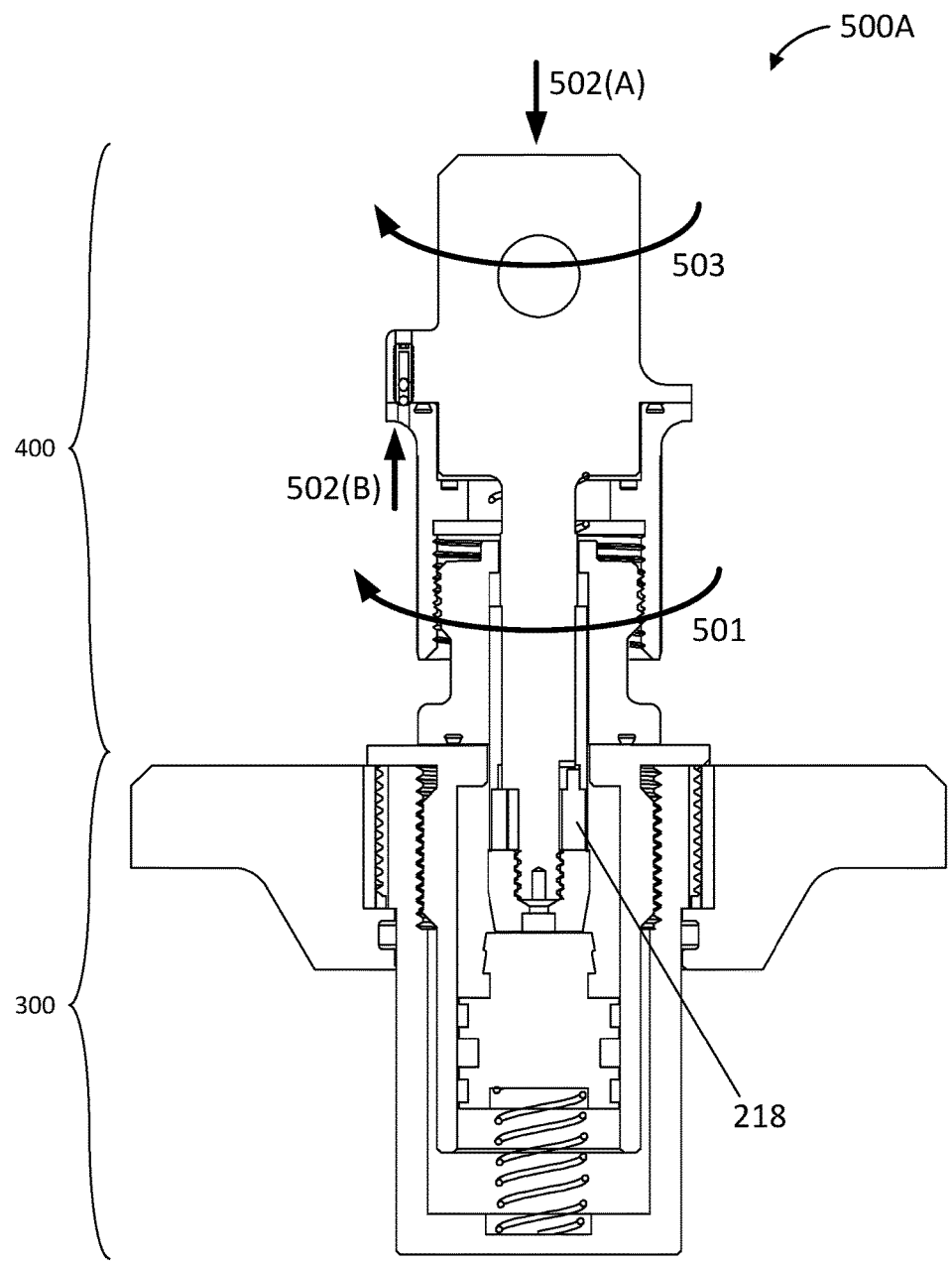
FIGS. 5A and 5B illustrate a detachable tie-down system in an attached configuration, in accordance with some embodiments.
Figure 5B:
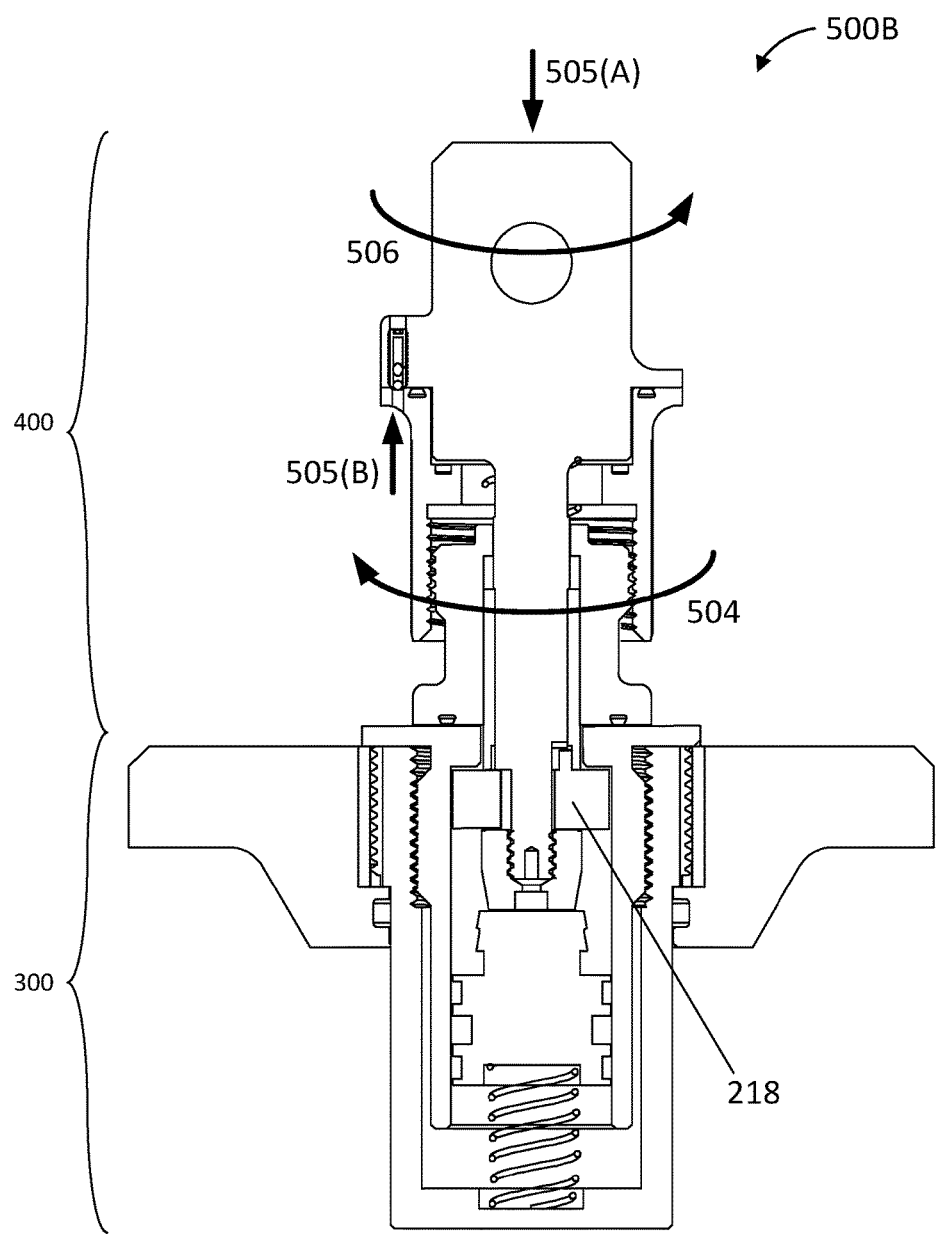

FIGS. 5A and 5B illustrate a detachable tie-down system in an attached configuration, in accordance with some embodiments. Specifically, FIG. 5A shows a cross-sectional view 500A of the detachable tie-down system of FIG. 2, in which the locking apparatus 400 is attached, but not locked, to the base apparatus 300. On the other hand, FIG. 5 shows a cross-section view 500B of the detachable tie-down system of FIG. 2, in which the locking apparatus 400 is attached and locked to the base apparatus 300. As shown in FIGS. 5A and 5B, the removable locking apparatus 400 may be attached to the base apparatus 300 by inserting the lower portion of the removable locking apparatus 400 (e.g., including the locking members 218 and at least a portion of the shaft socket 211 and shaft body 210) in the channel 203 of the base apparatus 400.

With reference to FIG. 5A, the removable locking apparatus 400 may be transitioned to the locked state (e.g., as shown in FIG. 5B) by first rotating the locking collar 213 in an angular direction 501 (e.g., clockwise). In some embodiments, at least a threshold amount of torque may need to be applied when rotating the locking collar 213 to overcome the rotational locking feature 214. As described above, rotating the locking collar 213 in the angular direction 501 reduces the effective length of the clutch mechanism 216, giving the clutch mechanism 216 more room to slide along the length of the shaft body 210. When the locking collar 213 is rotated to an unlocking position, a force may be applied to the top of the shaft body 210 in a downward direction 502(A). In some embodiments, an equal amount of force may be applied to the locking collar 213 in the opposite direction 502(B) (e.g., as applied by the user and/or platform to which the base apparatus 300 is mounted). The forces 502(A) and 502(B) may disengage the clutch mechanism 216 from the shaft body 210 (e.g., by sliding the clutch mechanism 216 past the engagement feature 401).

Then, while maintaining the forces 502(A) and 502(B) (e.g., to keep the clutch mechanism 216 disengaged from the shaft body 210), the shaft body 210 may be rotated in an angular direction 503 (e.g., clockwise) relative to the shaft socket 211 and/or clutch mechanism 216. This causes the locking elements 218 to extend from the shaft socket 211 and latch onto the inside of the channel 203, thereby locking the removable locking apparatus 400 to the base apparatus 300. In some embodiments, the locking elements 218 may be locked in the extended state by releasing the forces 502(A) and 502(B) and rotating the locking collar 213 in the direction opposite the angular direction 501 (e.g., counterclockwise) until the locking collar 213 returns to the locking position. In some embodiments, the locking collar 213 may be rotated until the rotational locking feature 214 is reengaged. As a result, the removable locking apparatus 400 will be securely locked to the base apparatus 300 (e.g., as depicted in FIG. 5B).

With reference to FIG. 5B, the removable locking apparatus 400 may be transitioned to the unlocked state (e.g., as shown in FIG. 5A) by first rotating the locking collar 213 in an angular direction 504 (e.g., clockwise). In some embodiments, at least a threshold amount of torque may need to be applied when rotating the locking collar 213 to overcome the rotation locking feature 214. As described above, rotating the locking collar 213 in the angular direction 504 reduces the effective length of the clutch mechanism 216, giving the clutch mechanism 216 more room to slide along the length of the shaft body 210. When the locking collar 213 is rotated to an unlocking position, a force may be applied to the top of the shaft body 210 in a downward direction 505(A). In some embodiments, an equal amount of force may be applied to the locking collar 213 in the opposite direction 505(B) (e.g., as applied by the user and/or platform to which the base apparatus 300 is mounted). The forces 505(A) and 505(B) may disengage the clutch mechanism 216 from the shaft body 210 (e.g., by sliding the clutch mechanism 216 past the engagement feature 401).

Then, while maintaining the forces 505(A) and 505(B) (e.g., to keep the clutch mechanism 216 disengaged from the shaft body 210), the shaft body 210 may be rotated in an angular direction 506 (e.g., counterclockwise) relative to the shaft socket 211 and/or clutch mechanism 216. This causes the locking elements 218 to retract within the shaft socket 211 and unlatch themselves from the inside of the channel 203, thereby unlocking the removable locking apparatus 400 from the base apparatus 300. In some embodiments, the locking elements 218 may be locked in the retracted state by releasing the forces 505(A) and 505(B) and rotating the locking collar 213 in the direction opposite the angular direction 506 (e.g., clockwise) until the locking collar 213 returns to the locking position. In some embodiments, the locking collar 213 may be rotated until the rotational locking feature 214 is engaged. As a result, the removable locking apparatus 400 will be positively unlocked from the base apparatus 300 (e.g., as depicted in FIG. 5A).

While particular embodiments have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure. Further, it should be noted that the various components disclosed herein may be described using computer aided design tools and expressed (or represented), as data and/or instructions embodied in various computer-readable media, in terms of their behavior, geometries, and/or other characteristics. Computer-readable media in which such formatted data and/or instructions may be embodied include, but are not limited to, non-volatile storage media in various forms (e.g., optical, magnetic or semiconductor storage media).

What is claimed is:

1. A removable locking apparatus for anchoring tie-down equipment, the removable locking apparatus comprising:
   a shaft body having an upper portion configured to receive the tie-down equipment;
   a shaft socket rotatably coupled to a lower portion of the shaft body;
   a plurality of locking members housed within the shaft socket, the plurality of locking members configured to:
      extend laterally from the shaft socket when the shaft body is rotated in a first direction relative to the shaft socket; and
      retract into the shaft socket when the shaft body is rotated in a second direction relative to the shaft socket; and
   a clutch mechanism coupled to the shaft socket and configured to slidably engage the shaft body, wherein:
      when disengaged from the shaft body, the clutch mechanism enables the plurality of locking members to extend or retract from the shaft socket; and
      when engaged with the shaft body, the clutch mechanism prevents the plurality of locking members from extending and retracting from the shaft socket.

2. The removable locking apparatus of claim 1, wherein the clutch mechanism enables the shaft body to rotate relative to the shaft socket when disengaged from the shaft body, and wherein the clutch mechanism locks the shaft body to the shaft socket when engaged with the shaft body.

3. The removable locking apparatus of claim 1, wherein the clutch mechanism is configured to engage the shaft body by sliding to a first position along the length of the shaft body, and wherein the clutch mechanism is configured to disengage the shaft body by sliding to a second position along the length of the shaft body.

4. The removable locking apparatus of claim 3, wherein the clutch mechanism is configured to slide to the second position when an external force is exerted on the clutch mechanism in a direction of the second position, and wherein the clutch mechanism is configured to return to the first position when no external forces are exerted on the clutch mechanism.

5. The removable locking apparatus of claim 3, further comprising:
   a spring coupled between the clutch mechanism and the upper portion of the shaft body, wherein the spring is in a decompressed state when the clutch mechanism is in the first position, and wherein the spring is in a compressed state when the clutch mechanism is in the second position.

6. The removable locking apparatus of claim 3, further comprising:
   a locking collar mated to the clutch mechanism and configured to prevent the clutch mechanism from sliding to the second position based at least in part on a positioning of the locking collar.

7. The removable locking apparatus of claim 6, wherein the locking collar is mated to the clutch mechanism via interlocking threads on an outer surface of the clutch mechanism and an inner surface of the locking collar, and wherein the clutch mechanism is prevented from sliding to the second position when the locking collar is rotated, along the interlocking threads, to a locking position.

8. The removable locking apparatus of claim 7, wherein a first rotational locking element on the upper portion of the shaft body is configured to engage a second rotational locking element on the locking collar when the locking collar is rotated to the locking position.

9. The removable locking apparatus of claim 8, wherein the first rotational locking element comprises a ball joint and the second rotation locking element comprises a divot, and wherein the ball joint is aligned with the divot when the locking collar is rotated to the first position.

10. A system for securing tie-down equipment to a platform, the system comprising:
    a base apparatus mounted to the platform, wherein a top surface of the base apparatus includes an opening to a channel within the base apparatus; and
    a removable locking apparatus coupled to the base apparatus, the removable locking apparatus including:
       a shaft body having an upper portion configured to receive the tie-down equipment;
       a shaft socket rotatably coupled to a lower portion of the shaft body and inserted into the channel of the base apparatus, the shaft socket configured to:
          lock the removable locking apparatus to the base apparatus when the shaft body is rotated in a first direction relative to the shaft socket; and
          unlock the removable locking apparatus from the base apparatus when the shaft socket is rotated in a second direction relative to the shaft socket; and
       a clutch mechanism coupled to the shaft socket and configured to slidably engage the shaft body, wherein:
          when disengaged from the shaft body, the clutch mechanism enables the removable locking apparatus to be locked or unlocked from the base apparatus; and
          when engaged with the shaft body, the clutch mechanism prevents the removable locking apparatus from being locked and unlocked from the base apparatus.

11. The system of claim 10, wherein the clutch mechanism is configured to disengage the shaft body by sliding to a first position along the length of the shaft body when an external force is exerted on the clutch mechanism in a direction of the first position, and wherein the clutch mechanism is configured to engage the shaft body by sliding to a second position along the length of the shaft body.

12. The system of claim 11, wherein the removable locking apparatus further comprises:
    a locking collar mated to the clutch mechanism via interlocking threads on an outer surface of the clutch mechanism and an inner surface of the locking collar, wherein the clutch mechanism is prevented from sliding to the second position when the locking collar is rotated, along the interlocking threads, to a locking position.

13. The system of claim 10, further comprising:
    a depressible plunger provided within the channel of the base apparatus, the depressible plunger configured to:
       establish a watertight seal around the opening at the top surface of the base apparatus when no external forces are exerted on the depressible plunger; and
       depress into the channel when one or more external forces are exerted on the depressible plunger.

14. The system of claim 13, further comprising an o-ring coupled to a base of the depressible plunger and configured to prevent water from entering the channel, beneath the depressible plunger, when the one or more forces are exerted on the depressible plunger.

15. The system of claim 10, wherein a bottom surface of the clutch mechanism is in contact with the top surface of the base apparatus when the locking apparatus is locked to the base apparatus.

16. The system of claim 15, further comprising an o-ring coupled to the bottom surface of the clutch mechanism and configured to prevent water from entering the channel of the base apparatus when the locking apparatus is locked to the base apparatus.

17. The system of claim 10, wherein the base apparatus comprises:
   an attachment collar mounted to the platform; and
   a housing mated to the attachment collar, wherein the channel is formed within the housing and a height of the housing is adjustable relative to the attachment collar.

18. The system of claim 17, wherein the attachment collar is mounted flush with a surface of the platform.

19. The system of claim 17, wherein the housing is mated to the attachment collar via interlocking threads on an outer surface of the housing and an inner surface of the locking collar, and wherein the height of the housing is adjusted by rotating the housing along the interlocking threads.

20. The system of claim 19, wherein a first set of grooves on the outer surface of the housing are configured to form one or more pinholes when aligned with a second set of grooves on the inner surface of the locking collar, and wherein the height of the housing is locked by inserting drift pins within the one or more pinholes.

* * * * *